(12) United States Patent
Suzuki

(10) Patent No.: US 11,572,096 B2
(45) Date of Patent: Feb. 7, 2023

(54) STEERING CONTROL METHOD AND STEERING CONTROL DEVICE

(71) Applicant: NISSAN MOTOR CO., LTD., Yokohama (JP)

(72) Inventor: Taku Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/622,999

(22) PCT Filed: Jun. 28, 2019

(86) PCT No.: PCT/JP2019/025806
§ 371 (c)(1),
(2) Date: Dec. 27, 2021

(87) PCT Pub. No.: WO2020/261530
PCT Pub. Date: Dec. 30, 2020

(65) Prior Publication Data
US 2022/0227417 A1 Jul. 21, 2022

(51) Int. Cl.
*B62D 6/00* (2006.01)
*B62D 15/02* (2006.01)

(52) U.S. Cl.
CPC .............. *B62D 6/008* (2013.01); *B62D 6/002* (2013.01); *B62D 15/0265* (2013.01)

(58) Field of Classification Search
CPC ..... B62D 6/008; B62D 6/002; B62D 15/0265
See application file for complete search history.

(56) References Cited

U.S. PATENT DOCUMENTS

| 8,386,119 B2* | 2/2013 | Kobayashi | B60G 17/0195 340/576 |
| 9,321,484 B2* | 4/2016 | Morotomi | B62D 6/002 |
| 2011/0259663 A1* | 10/2011 | Goutsu | B62D 6/002 701/41 |
| 2013/0073147 A1 | 3/2013 | Tashiro | |
| 2019/0039650 A1* | 2/2019 | Sato | B62D 5/0472 |

FOREIGN PATENT DOCUMENTS

| JP | 2000-072017 A | 3/2000 | |
| JP | 2004-306727 A | 11/2004 | |
| JP | 2006-315617 A | 11/2006 | |
| JP | 2009-101809 A | 5/2009 | |
| JP | 2009-241725 A | 10/2009 | |
| JP | 2010-149650 A | 7/2010 | |
| JP | 2010-280276 A | 12/2010 | |
| JP | 2013-063680 A | 4/2013 | |
| WO | WO-03059680 A1 * | 7/2003 | ........ B60W 30/1819 |

* cited by examiner

*Primary Examiner* — Peter D Nolan
*Assistant Examiner* — Demetra R Smith-Stewart
(74) *Attorney, Agent, or Firm* — Foley & Lardner LLP

(57) ABSTRACT

A steering control method including: applying a steering reaction force obtained by adding a first steering reaction force according to a steering angle of a steering wheel and a second steering reaction force according to a steering angular acceleration of the steering wheel to the steering wheel; determining a possibility that an emergency steering operation of the steering wheel by a driver will be performed; and when it is determined that there is the possibility of the emergency steering operation being performed, making the second steering reaction force small compared with when it is not determined that there is the possibility of the emergency steering operation being performed.

7 Claims, 8 Drawing Sheets

STEERING CONTROL METHOD AND STEERING CONTROL DEVICE

TECHNICAL FIELD

The present invention relates to a steering control method and a steering control device.

BACKGROUND ART

Technologies for controlling a steering reaction force applied to a steering wheel in response to a driver's steering operation have been proposed.

For example, a vehicle steering reaction force control device described in PTL 1 includes an emergency steering wheel operation necessity determination means that determines whether or not an emergency steering wheel operation (emergency steering operation) for avoiding an obstacle in an emergency is necessary and a steering reaction force reducing means that reduce the steering reaction force when the emergency steering wheel operation is necessary.

CITATION LIST

Patent Literature

PTL 1: JP 2009-241725 A

SUMMARY OF INVENTION

Technical Problem

However, simply reducing the steering reaction force when the driver performs the emergency steering operation of the steering wheel may make the driver feel uncomfortable due to a difference from a steering reaction force when the emergency steering operation is not necessary.

It is an object of the present invention to improve operability of a steering wheel while reducing a sense of discomfort about a steering reaction force when a driver performs an emergency steering operation of the steering wheel.

Solution to Problem

According to an aspect of the present invention, there is provided a steering control method including: applying a steering reaction force obtained by adding a first steering reaction force according to a steering angle of a steering wheel and a second steering reaction force according to a steering angular acceleration of the steering wheel to the steering wheel; determining a possibility that an emergency steering operation of the steering wheel by a driver will be performed; and when it is determined that there is the possibility of the emergency steering operation being performed, making the second steering reaction force small compared with when it is not determined that there is the possibility of the emergency steering operation being performed.

Advantageous Effects of Invention

According to the aspect of the present invention, it is possible to improve operability of a steering wheel while reducing a sense of discomfort about a steering reaction force when a driver performs an emergency steering operation of the steering wheel.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, embodiments of the present invention will be described with reference to the drawings.

(Configuration)

Figure 1:
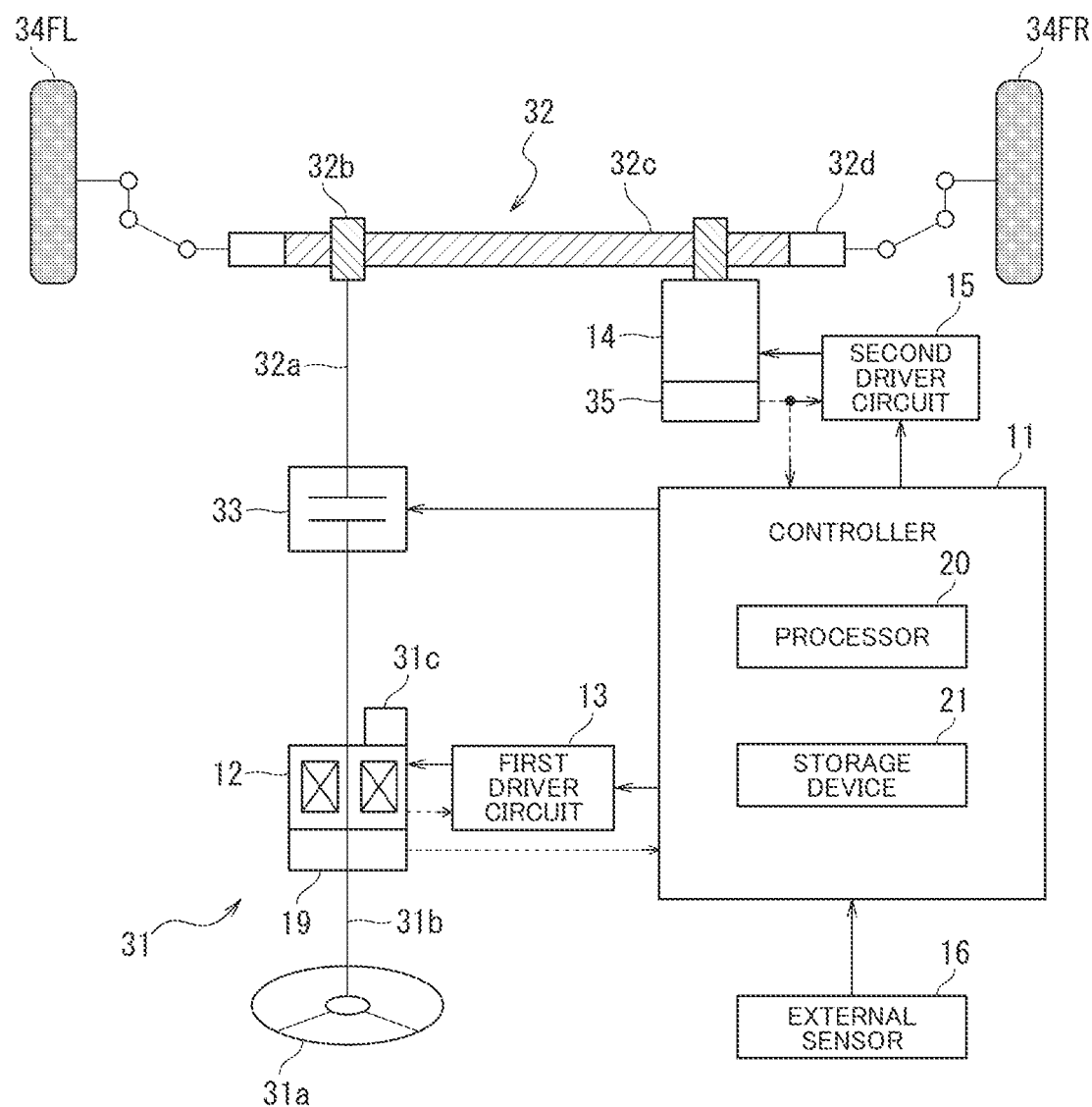
FIG. 1 is a schematic configuration diagram of one example of a steering system of a vehicle on which a steering control device is mounted.

FIG. 1 is a schematic configuration diagram of one example of a steering system of a vehicle (hereinafter referred to as "host vehicle") on which a steering control device according to the present embodiment is mounted.

As illustrated in FIG. 1, the host vehicle includes a steering unit 31, a wheel-turning unit 32, and a backup clutch 33. Additionally, the host vehicle includes a controller 11 and an external sensor 16.

The host vehicle employs a steer-by-wire (SBW) system in which when the backup clutch 33 is released, the steering unit 31 that receives a steering input of a driver and the wheel-turning unit 32 that turns left and right front wheels 34FL and 34FR, which are steered wheels, are mechanically disconnected. In the following description, the left and right front wheels 34FL and 34FR may be referred to as "steered wheels 34".

The steering unit 31 includes a steering wheel 31a, a column shaft 31b, a current sensor 31c, a reaction force actuator 12, a first driver circuit 13, and a steering angle sensor 19.

On the other hand, the wheel-turning unit 32 includes a pinion shaft 32a, a steering gear 32b, a rack gear 32c, a steering rack 32d, a wheel-turning actuator 14, a second driver circuit 15, and a wheel-turning angle sensor 35.

The reaction force actuator 12 applies a reaction force on the steering wheel 31a of the steering unit 31, and the steering wheel 31a rotates in response to the input of a steering torque applied by the driver. Note that, in the present specification, the reaction torque applied to the steering wheel by the actuator may be referred to as "steering reaction torque".

The column shaft 31b rotates integrally with the steering wheel 31a.

On the other hand, the steering gear 32b of the wheel-turning unit 32 meshes with the rack gear 32c, and turns the steered wheels 34 according to rotation of the pinion shaft 32a. As the steering gear 32b, for example, a rack and pinion type steering gear or the like may be employed.

The backup clutch 33 is provided between the column shaft 31b and the pinion shaft 32a. Then, when the backup clutch 33 is released, the steering unit 31 and the wheel-turning unit 32 are mechanically disconnected, and when it is engaged, the steering unit 31 and the wheel-turning unit 32 are mechanically connected.

The external sensor 16 is a sensor that detects a surrounding environment of the host vehicle, for example, objects around the host vehicle. The external sensor 16 may include, for example, a camera and a distance measuring device.

The camera and the distance measuring device detect the surrounding environment of the host vehicle, such as objects present around the host vehicle (for example, other vehicles, pedestrians, white lines such as lane boundary lines and lane markings, and features such as traffic signals, stop lines, signs, buildings, utility poles, curbs, and crosswalks provided on roads or near the roads), relative positions of the objects with respect to the host vehicle, and relative distances between the host vehicle and the objects.

The camera may be, for example, a stereo camera. The camera may be a monocular camera, in which the same object may be photographed from a plurality of viewpoints by the monocular camera, and a distance to the object may be calculated. Additionally, the distance to the object may be calculated on the basis of a ground contact position of the object detected from an image captured by the monocular camera.

The distance measuring device may be, for example, a laser range-finder (LRF), a radar unit, or a laser scanner unit.

The steering angle sensor 19 detects a column shaft rotation angle, i.e., an actual steering angle $\theta s$ (a steering wheel angle) of the steering wheel.

The wheel-turning angle sensor 35 detects a wheel-turning angle (actual wheel-turning angle) $\theta t$ of the steered wheels 34.

The controller 11 is an electronic control unit (ECU) that performs wheel-turning control of the steered wheels and reaction force control of the steering wheel. In the present specification, the "reaction force control" refers to control of a steering reaction torque applied to the steering wheel 31a by an actuator such as the reaction force actuator 12. The controller 11 includes a processor 20 and a peripheral component such as a storage device 21. The processor 20 may be, for example, a central processing unit (CPU) or a micro-processing unit (MPU).

The storage device 21 may include a semiconductor storage device, a magnetic storage device, and an optical storage device. The storage device 21 may include memories, such as register, cache memory, and read only memory (ROM) and random access memory (RAM) used as primary storage devices.

Note that the controller 11 may be realized by a functional logic circuit set in a general-purpose semiconductor integrated circuit. For example, the controller 11 may include a programmable logic device (PLD), such as a field-programmable gate array (FPGA), or the like.

Figure 2:
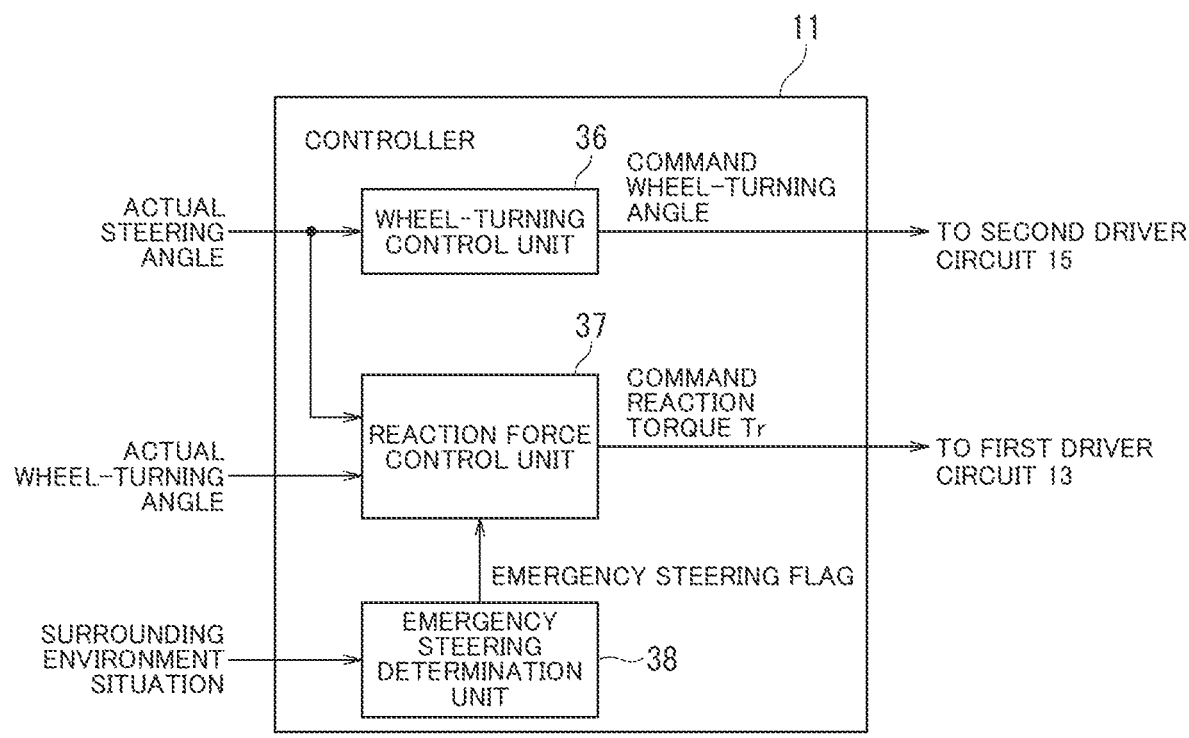
FIG. 2 is a block diagram illustrating a functional configuration example of a controller of FIG. 1.

FIG. 2 is a block diagram illustrating a functional configuration example of the controller 11. The controller 11 includes a wheel-turning control unit 36, a reaction force control unit 37, and an emergency steering determination unit 38.

Functions of the wheel-turning control unit 36, the reaction force control unit 37, the emergency steering determination unit 38 may be realized, for example, by allowing the processor 20 to execute a computer program stored in the storage device 21 of the controller 11.

The wheel-turning control unit 36 determines a command wheel-turning angle, which is a command value of the wheel-turning angle of the steered wheels 34, according to the actual steering angle $\theta s$ of the steering wheel 31a.

The wheel-turning control unit 36 outputs the calculated command wheel-turning angle to the second driver circuit 15, and drives the wheel-turning actuator 14 so that the actual wheel-turning angle $\theta t$ becomes the command wheel-turning angle.

Reference will be made to FIG. 1. The wheel-turning actuator 14 may be, for example, an electric motor such as a brushless motor. An output shaft of the wheel-turning actuator 14 is connected to the rack gear 32c via a decelerator.

The wheel-turning actuator 14 outputs a wheel-turning torque for turning the steered wheels 34 to the steering rack 32d in response to a command current output from the second driver circuit 15.

The wheel-turning angle sensor 35 detects a rotation angle of the output shaft of the wheel-turning actuator 14, and detects the wheel-turning angle of the steered wheels 34 on the basis of the detected rotation angle.

The second driver circuit 15 controls the command current to the wheel-turning actuator 14 by servo control so that the actual wheel-turning angle detected by the wheel-turning angle sensor 35 matches the command wheel-turning angle indicated by a control signal from the wheel-turning control unit 36.

Reference will be made to FIG. 2. The emergency steering determination unit 38 determines whether or not there is a possibility that an emergency steering operation of the steering wheel 31a by the driver will be performed.

Hereinafter, the emergency steering operation of the steering wheel 31a by the driver may be simply referred to as the "emergency steering operation". Note that the emergency steering operation means a sudden steering operation, such as an operation performed when a sudden change in a direction of travel of the vehicle is required, unlike a steering operation during normal driving, such as traveling along a lane. One example thereof is emergency steering for avoiding an obstacle around the host vehicle.

For example, the emergency steering determination unit 38 determines whether or not there is a possibility of the emergency steering operation being performed on the basis of surrounding environment information, which is information about the surrounding environment detected by the external sensor 16.

For example, the emergency steering determination unit 38 calculates a risk to an obstacle around the host vehicle, determines that there is the possibility of the emergency steering operation being performed when the calculated risk is equal to or more than a threshold value, and does not determine that there is the possibility of the emergency steering operation being performed when the calculated risk is less than the threshold value. Alternatively, when the risk is less than the threshold value, the emergency steering determination unit 38 determines that there is no possibility that the emergency steering operation will be performed.

For example, the emergency steering determination unit 38 may calculate a time to collision (TTC) with respect to an obstacle as the above risk. The emergency steering determination unit 38 may determine that the risk is equal to or more than a previously determined prescribed threshold value when the time to collision (TTC) is equal to or more than a prescribed value.

Additionally, for example, the emergency steering determination unit 38 may calculate a time-headway (THW) with respect to another vehicle ahead of the host vehicle as the above risk. The emergency steering determination unit 38 may determine that the risk is equal to or more than the threshold value when the time-headway (THW) is equal to or less than a previously determined prescribed value.

Alternatively, as described above, depending on the time to collision (TTC) or the time-headway (THW), a higher risk may be calculated for a shorter time to collision (TTC) or time-headway (THW), and it may be determined that the calculated risk is equal to or less than the previously determined prescribed threshold value.

Furthermore, the position of an obstacle in the direction of travel of the host vehicle may be detected to calculate an overlap amount or an offset amount of the obstacle with respect to a width direction of the host vehicle, and when the time to collision (TTC) or the time-headway (THW) is equal to or less than the previously determined prescribed value and the overlap amount is equal to or more than a previously determined prescribed value or the offset amount is equal to or less than a previously determined prescribed value, it may be determined that the risk is equal to or more than the threshold value.

The emergency steering determination unit 38 outputs an emergency steering flag indicating a determination result as to whether or not there is a possibility that the emergency steering operation will be performed.

The reaction force control unit 37 calculates a command reaction torque Tr, which is a command value of a steering reaction torque applied to the steering wheel (a rotation torque applied to the steering wheel 31a, which is hereinafter also referred to as reaction torque), according to a detection result of the actual steering angle θs by the steering angle sensor 19, a detection result of the actual wheel-turning angle θt by the wheel-turning angle sensor 35, and the emergency steering flag.

The reaction force control unit 37 outputs a control signal that causes the reaction force actuator 12 to generate the command reaction torque Tr to the first driver circuit 13, and drives the reaction force actuator 12 to apply the calculated steering reaction torque to the steering wheel.

Reference will be made to FIG. 1. The reaction force actuator 12 may be, for example, an electric motor. The reaction force actuator 12 includes an output shaft located on the same axis as the column shaft 31b.

The reaction force actuator 12 outputs a rotation torque to be applied to the steering wheel 31a to the column shaft 31b in response to a command current output from the first driver circuit 13. By applying the rotation torque, the steering reaction torque is generated on the steering wheel 31a.

The first driver circuit 13 controls the command current output to the reaction force actuator 12 by torque feedback that matches an actual steering reaction torque estimated from a drive current of the reaction force actuator 12 detected by the current sensor 31c with the command steering torque Tr indicated by the control signal output from the reaction force control unit 37. Alternatively, the first driver circuit 13 may control the command current output to the reaction force actuator 12 by current feedback that matches the drive current of the reaction force actuator 12 detected by the current sensor 31c with a drive current corresponding to the command reaction torque Tr.

The reaction force actuator 12, the first driver circuit 13, and the controller 11 form the steering control device.

Figure 3:
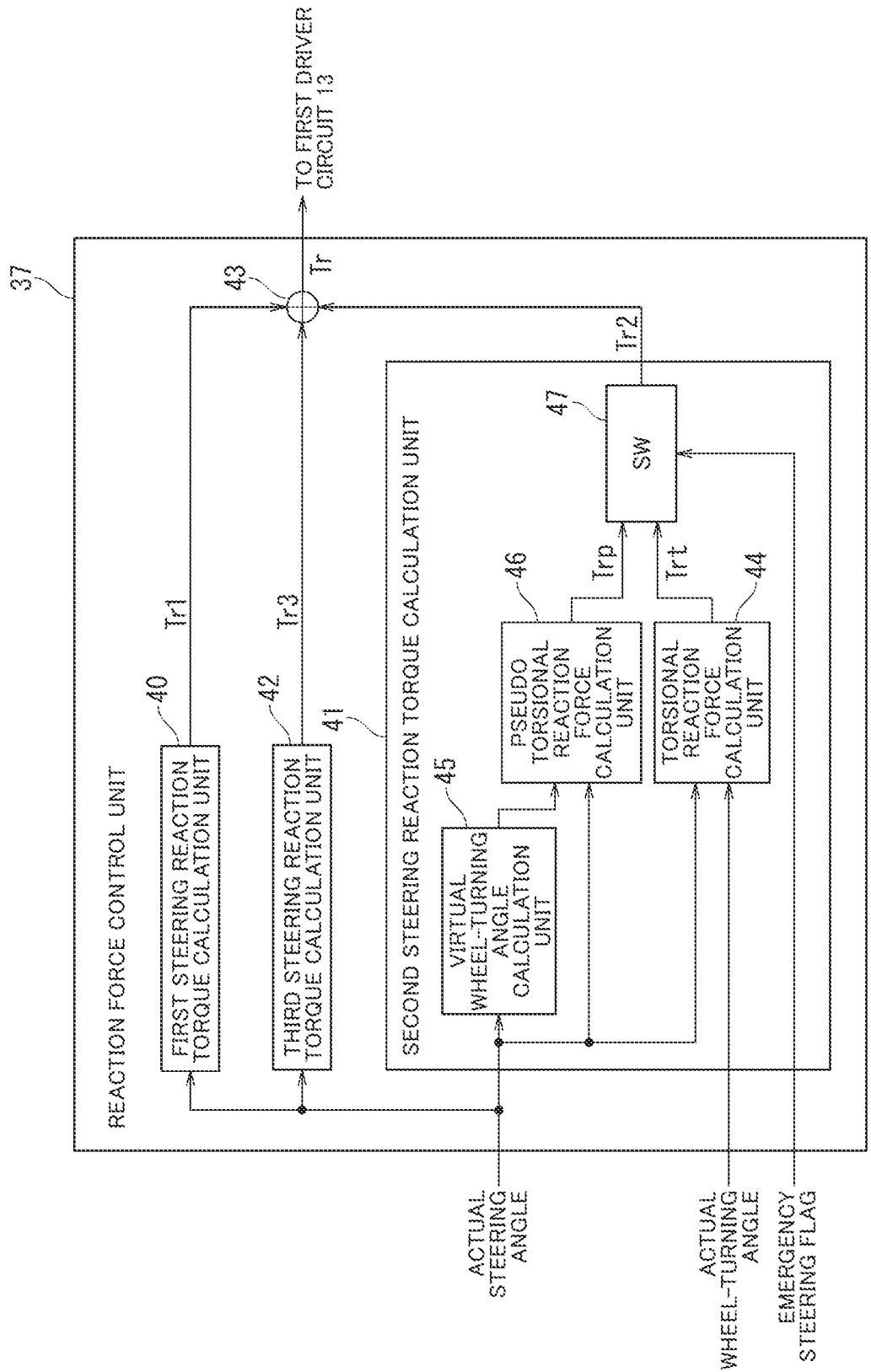
FIG. 3 is a block diagram illustrating a functional configuration example of a reaction force control unit of FIG. 2.

Next, a description will be given of the command reaction torque Tr (i.e., the steering reaction torque) determined by the reaction force control unit 37. Reference will be made to FIG. 3.

The reaction force control unit 37 includes a first steering reaction torque calculation unit 40, a second steering reaction torque calculation unit 41, a third steering reaction torque calculation unit 42, and an adder 43.

The first steering reaction torque calculation unit 40 calculates a first steering reaction torque Tr1 according to the actual steering angle θs.

Figure 4:
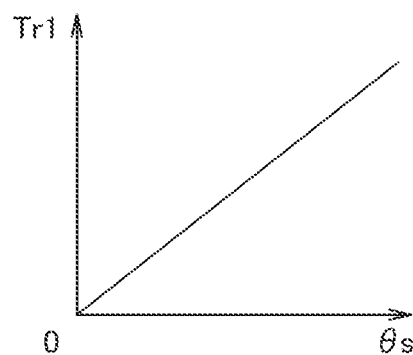
FIG. 4 is an illustrative diagram of one example of a first steering reaction torque Tr1.

FIG. 4 illustrates one example of the first steering reaction torque Tr1. The first steering reaction torque calculation unit 40 calculates, as the first steering reaction torque Tr1, a reaction torque in a direction of trying to return the steering wheel 31a in a neutral position. The first steering reaction torque Tr1 increases as a deviation between the neutral position of the steering wheel 31a and the actual steering angle θs increases. The first steering reaction torque calculation unit 40 outputs the first steering reaction torque Tr1 to the adder 43.

Reference will be made to FIG. 3. The second steering reaction torque calculation unit 41 calculates a second steering reaction torque Tr2 according to a steering angular acceleration $d^2\theta s/dt^2$ of the actual steering angle θs of the steering wheel 31a.

Furthermore, the second steering reaction torque calculation unit 41 controls the second steering reaction torque Tr2 on the basis of the emergency steering flag. When the emergency steering determination unit 38 determines that there is a possibility that the emergency steering operation will be performed, the second steering reaction torque Tr2 is made smaller than when it is not determined that there is the possibility that the emergency steering operation will be performed (or it is determined that there is no possibility that the emergency steering operation will be performed).

Here, the second steering reaction torque Tr2 corresponding to the steering angular acceleration $d^2\theta s/dt^2$ includes a torque component proportional to a force (steering torque) applied to the steering wheel 31a by the driver.

Accordingly, when the driver applies a large force (steering torque) to the steering wheel 31a in an attempt to steer quickly during the emergency steering operation, making the second steering reaction torque Tr2 smaller can reduce a steering reaction force that is initially generated in response to such large force. This facilitates the emergency steering operation and improves operability of the steering wheel 31a.

In the embodiment of FIG. 3, the second steering reaction torque calculation unit 41 includes a torsional reaction force calculation unit 44, a virtual wheel-turning angle calculation unit 45, a pseudo torsional reaction force calculation unit 46, and a switching unit 47. In FIG. 3, the switching unit is denoted by "SW".

The torsional reaction force calculation unit 44 calculates a torsional reaction torque Trt that increases with a delay in a change of the actual wheel-turning angle θt with respect to a change of the actual steering angle θs.

By applying such a torsional reaction torque Trt, as one component of the steering reaction force, to the steering wheel 31a, feedback of a ground contact state of the steered wheels 34 on a road surface can be given to the driver.

The torsional reaction force calculation unit 44 calculates the torsional reaction torque Trt according to a difference between the actual steering angle θs and the actual wheel-turning angle θt of the steered wheels 34.

Specifically, the torsional reaction force calculation unit 44 calculates a pinion angle (a rotation angle of the pinion shaft 32a) corresponding to the actual wheel-turning angle θt, and calculates the torsional reaction torque Trt proportional to an angle difference between the actual steering angle θs and the pinion angle.

The angle difference between the actual steering angle θs and the pinion angle changes with the force (torque) applied to the steering wheel 31a. Therefore, the torsional reaction torque Trt becomes a larger reaction torque as the steering angular acceleration $d^2\theta s/dt^2$ of the steering wheel 31a is larger.

The torsional reaction torque Trt changes with the actual wheel-turning angle θt, and thus changes depending on a wasted time from the change of the actual steering angle θs to a start of movement of the steered wheels 34.

Additionally, when a response delay of the actual wheel-turning angle θt (i.e. a difference between a change rate in the actual steering angle θs and a change rate in the actual wheel-turning angle θt) changes according to a difference of a road surface load, the torsional reaction torque Trt also changes according to this.

Regarding a response speed of the actual wheel-turning angle θt to the change of the actual steering angle θs, a response guarantee is provided in the servo control of the second driver circuit 15 that controls wheel turning of the steered wheels 34, and the steered wheels 34 are driven to realize a behavioral model that keeps the wasted time and the response delay to prescribed design values or less.

While the driver is operating the steering wheel 31a relatively gently, the actual wheel-turning angle θt changes within a range of the response guarantee of the servo control by the second driver circuit 15. This keeps the wasted time and the response delay to the prescribed design values or less.

On the other hand, when sudden steering is performed like the emergency steering operation, the actual wheel-turning angle θt cannot follow within the range of the response guarantee of the servo control. In this case, the wasted time and the response delay from the change of the actual steering angle θs to the start of movement of the steered wheels 34 become large. In this way, the torsional reaction torque Trt changes depending on the traveling situation.

Figure 5A:
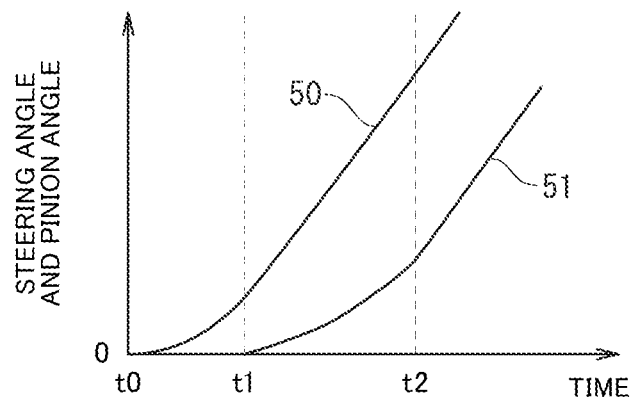
FIG. 5A is an illustrative diagram of one example of a pinion angle corresponding to an actual wheel-turning angle and an actual steering angle.

FIG. 5A illustrates one example of a pinion angle corresponding to the actual wheel-turning angle θt and the actual steering angle θs. A solid line 50 indicates the actual steering angle θs, and a solid line 51 indicates the pinion angle.

Figure 5B:
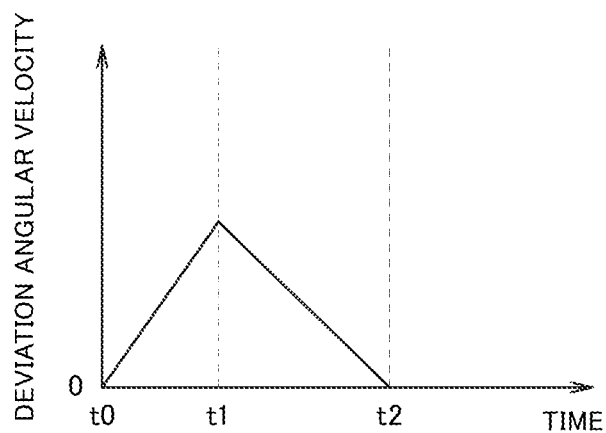
FIG. 5B is an illustrative diagram of a deviation angular velocity between the pinion angle and the actual steering angle of FIG. 5A.
Figure 5C:
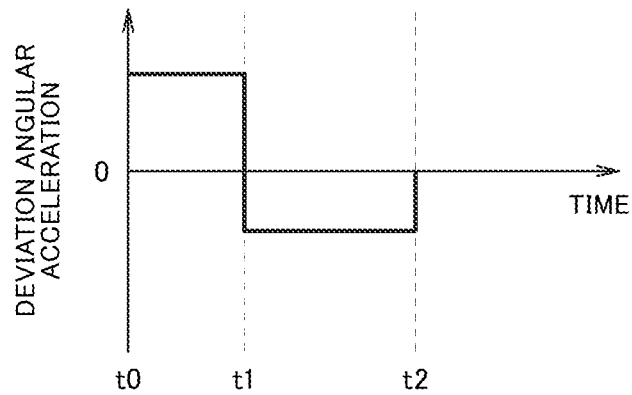
FIG. 5C is an illustrative diagram of a deviation angular acceleration between the pinion angle and the actual steering angle of FIG. 5A.

FIGS. 5B and 5C illustrate a deviation angular velocity and a deviation angular acceleration between the pinion angle and the actual steering angle θs of FIG. 5A.

After the actual steering angle θs changes at time point t0, the pinion angle starts to change at time point t1. This period from time point t0 to time point t1 becomes a wasted time. Additionally, in a period from time point t1 to time point t2, there is a response delay. Performing sudden steering results in longer wasted time and increased response delay.

Accordingly, the difference between the actual steering angle θs and the actual wheel-turning angle θt becomes large, thus increasing the torsional reaction torque Trt.

Therefore, in the present embodiment, instead of the actual wheel-turning angle θt, a virtual wheel-turning angle that changes with the actual steering angle θs is calculated, and when there is a possibility of the emergency steering operation being performed, the second steering reaction torque Tr2 is calculated according to a difference between the virtual wheel-turning angle and the actual steering angle θs.

The virtual wheel-turning angle calculation unit 45 calculates the vertical wheel-turning angle that changes with the actual steering angle θs.

The virtual wheel-turning angle calculation unit 45 calculates the virtual wheel-turning angle so that the virtual wheel-turning angle responds to the change of the actual steering angle θs earlier than the actual wheel-turning angle θt when there is sudden steering. In other words, when there is sudden steering, a delay time from a start of change of the actual steering angle θs to a start of change of the virtual wheel-turning angle is shorter than a delay time from the start of change of the actual steering angle θs to a start of change of the actual wheel-turning angle θt.

For example, the virtual wheel-turning angle calculation unit 45 calculates the virtual wheel-turning angle so that the wasted time and response delay of the virtual wheel-turning angle satisfy the response guarantee of the serve control by the second driver circuit 15 (i.e., so that they become equal to or less than the design values of the wasted time and the response delay guaranteed by the response guarantee).

The pseudo torsional reaction force calculation unit 46 calculates a pseudo torsional reaction torque Trp according to a difference between the virtual wheel-turning angle and the actual steering angle θs.

Specifically, the pseudo torsional reaction force calculation unit 46 calculates the pseudo torsional reaction torque Trp proportional to an angle difference between a pinion angle corresponding to the virtual wheel-turning angle and the actual steering angle θs.

In this way, the pseudo torsional reaction force calculation unit 46 calculates the pseudo torsional reaction torque Trp on the basis of the virtual wheel-turning angle virtually calculated instead of the actual wheel-turning angle θt.

Therefore, even when there is sudden steering, the wasted time and response delay of the virtual wheel-turning angle do not change and are kept to relatively small values (for example, previously determined values equal to or less than the design values of the response guarantee). As a result, the wasted time and response delay generated at the virtual wheel-turning angle become smaller than the wasted time and response delay generated at the actual wheel-turning angle θt, so that the pseudo torsional reaction torque Trp is smaller than the torsional reaction torque Trt.

Figure 6A:
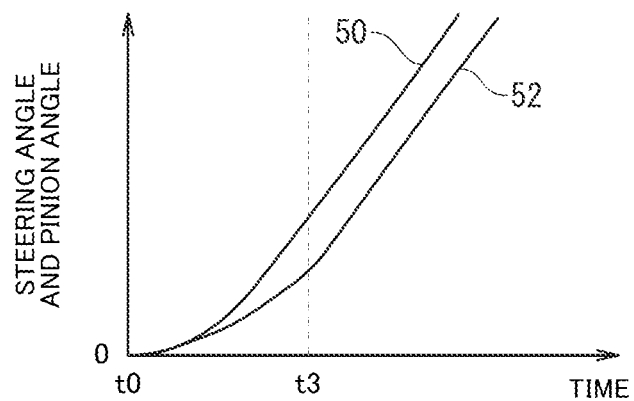
FIG. 6A is an illustrative diagram of one example of a pinion angle corresponding to a virtual wheel-turning angle and the actual steering angle.

FIG. 6A illustrates one example of the pinion angle corresponding to the virtual wheel-turning angle and the actual steering angle θs. The solid line 50 indicates the actual steering angle θs, and a solid line 52 indicates the pinion angle.

Figure 6B:
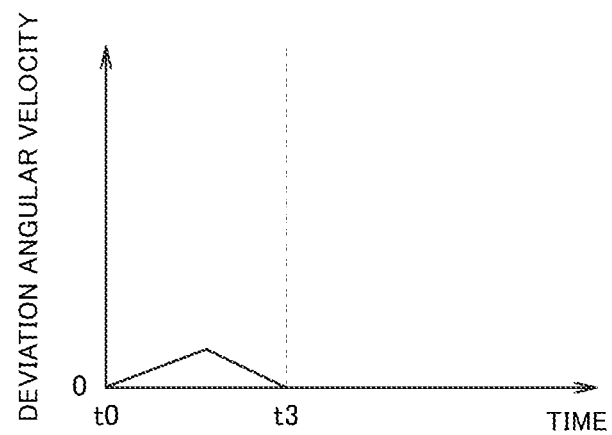
FIG. 6B is an illustrative diagram of a deviation angular velocity between the pinion angle and the actual steering angle of FIG. 6A.
Figure 6C:
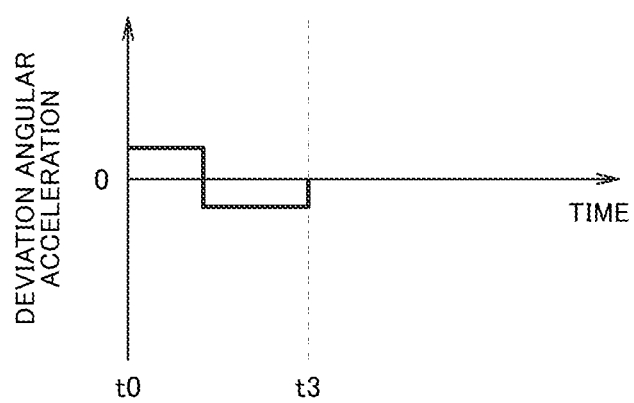
FIG. 6C is an illustrative diagram of a deviation angular acceleration between the pinion angle and the actual steering angle of FIG. 6A.

FIGS. 6B and 6C illustrate a deviation angular velocity and a deviation angular acceleration between the pinion angle and the actual steering angle θs of FIG. 6A.

The pinion angle corresponding to the virtual wheel-turning angle is set small so that the wasted time from the change of the actual steering angle θs to a start of change of the pinion angle satisfies the design value designed by the response guarantee.

Additionally, in a period from time point t0 to time point t3, there is a response delay of the pinion angle with respect to the actual steering angle θs (i.e., a change rate in the pinion angle is smaller than a change rate in the actual steering angle θs). However, a difference therebetween is set small so as to satisfy the design value designed by the response guarantee.

Therefore, even when there is sudden steering, the difference between the actual steering angle θs and the virtual wheel-turning angle is maintained at a small value, so that the pseudo torsional reaction torque Trp is smaller than the torsional reaction torque Trt.

Reference will be made to FIG. 3. When the emergency steering determination unit 38 determines that there is a possibility of the emergency steering operation being performed on the basis of the emergency steering flag, the switching unit 47 outputs the pseudo torsional reaction torque Trp, as the second steering reaction torque Tr2, to the adder 43.

When it is not determined that there is the possibility of the emergency steering operation being performed (or when it is determined that there is no possibility of the emergency steering operation being performed), the torsional reaction torque Trt is output as the second steering reaction torque Tr2 to the adder 43.

As a result, when there is a possibility that the emergency steering operation will be performed, the second steering reaction torque Tr2 can be made smaller.

The third steering reaction torque calculation unit 42 calculates a third steering reaction torque Tr3 according to the steering angular velocity dθs/dt of the actual steering angle θs.

Figure 7:
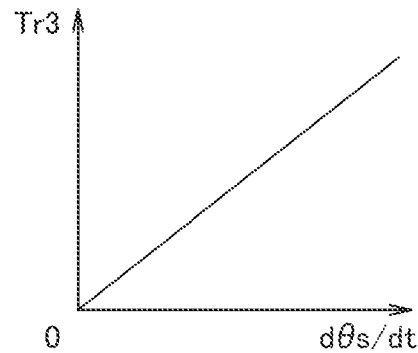
FIG. 7 is an illustrative diagram of one example of a third steering reaction torque Tr3.

FIG. 7 illustrates one example of the third steering reaction torque Tr3. The third steering reaction torque calculation unit 42 calculates, as the third steering reaction torque Tr3, a steering torque opposite to a direction in which the actual steering angle θs changes. The third steering reaction torque Tr3 increases as the steering angular velocity dθs/dt increases. By applying the third steering reaction torque Tr3 to the steering wheel 31a, a steering reaction force corresponding to a frictional component and a viscous component can be applied. The third steering reaction torque calculation unit 42 outputs the third steering reaction torque Tr3 to the adder 43.

The adder 43 adds the first steering reaction torque Tr1, the second steering reaction torque Tr2, and the third steering reaction torque Tr3 to calculate the command reaction torque Tr, and outputs a control signal that causes the reaction force actuator 12 to generate the command reaction torque Tr to the first driver circuit 13.

With the above configuration, when the emergency steering determination unit 38 determines that there is a possibility of the emergency steering operation being performed, only the second steering reaction torque Tr2 becomes smaller than when it is not determined that there is the possibility of the emergency steering operation being performed (or when it is determined that there is no possibility of the emergency steering operation being performed).

Therefore, when a large force is applied to the steering wheel 31a by the driver who attempts to steer quickly during the emergency steering operation, the steering reaction force initially generated in response to such large force can be reduced. This facilitates the emergency steering operation and improves operability of the steering wheel 31a.

On the other hand, there remains a moderate steering reaction force due to the first steering reaction torque Tr1 and the third steering reaction torque Tr3, so that even when the second steering reaction torque Tr2 becomes small, a sense of discomfort about the steering reaction force can be reduced. Additionally, while the present embodiment adds the third steering reaction torque Tr3 according to the steering angular velocity dθs/dt to the first and second steering reaction torques Tr1 and Tr2 to obtain the command reaction torque Tr, the third steering reaction torque Tr3 is the steering reaction force corresponding to the frictional component and the viscous component, as described above, and has a very small value compared with the first and second steering reaction torques Tr1 and Tr2. Therefore, a value obtained by adding only the first and second steering reaction torques Tr1 and Tr2 may be used as the command reaction torque Tr, and the third steering reaction torque Tr3 is not always required. However, in order to apply a more desirable steering reaction force, as described in the present embodiment, it is preferable to add the third steering reaction torque Tr3 to the first and second steering reaction torques Tr1 and Tr2 to obtain the command reaction torque Tr.

(Operation)

Figure 8:
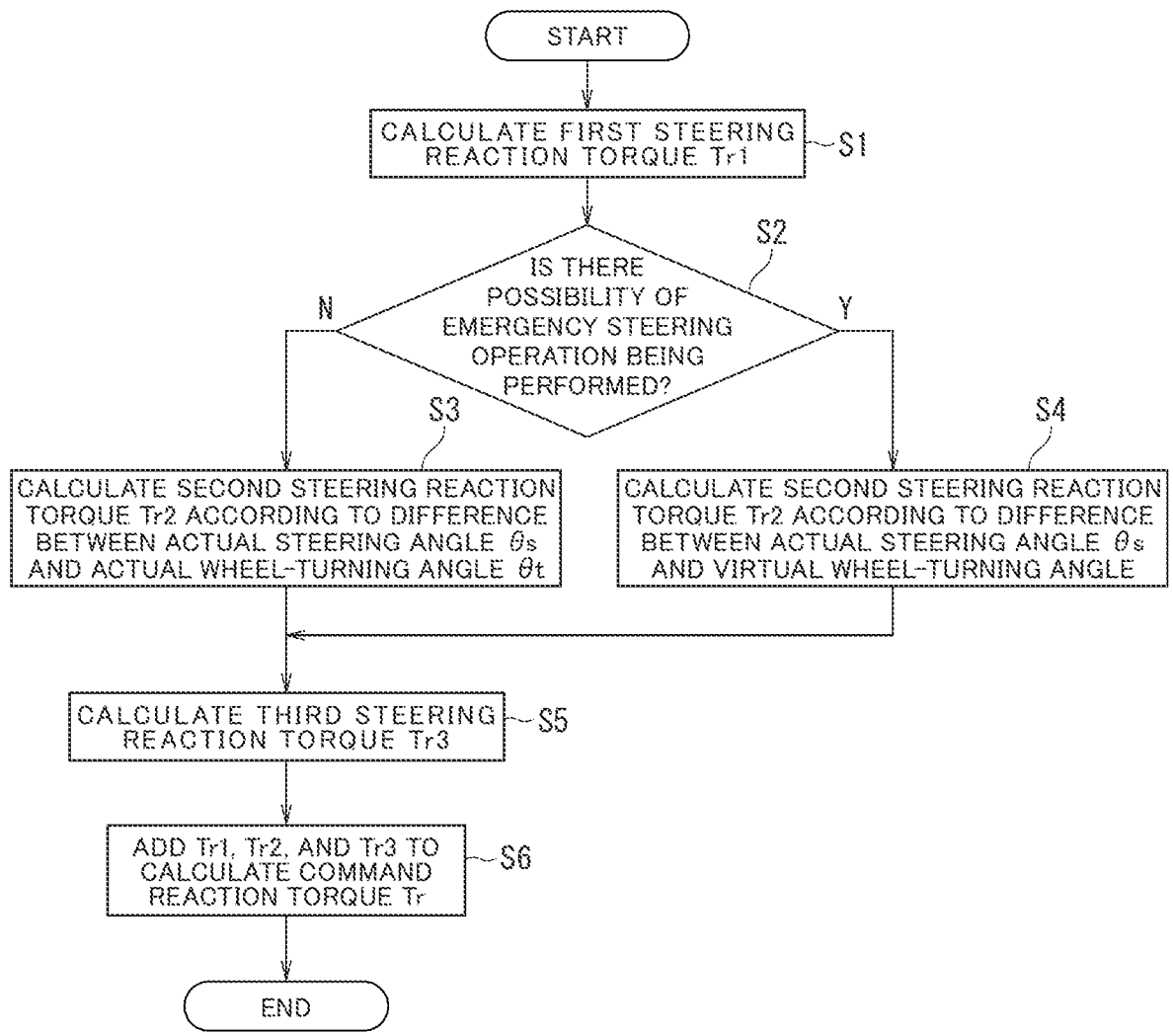
FIG. 8 is a flowchart of one example of a steering control method of an embodiment.

Next, one example of a steering control method of an embodiment will be described with reference to FIG. 8.

At step S1, the first steering reaction torque calculation unit 40 calculates the first steering reaction torque Tr1 according to the actual steering angle θs.

At step S2, the emergency steering determination unit 38 determines whether or not there is the possibility that the emergency steering operation will be performed. When it is determined that there is the possibility of the emergency steering operation being performed (step S2: Y), processing proceeds to step S4.

When it is not determined that there is the possibility of the emergency steering operation being performed or when it is determined that there is no possibility of the emergency steering operation being performed (step S2: N), processing proceeds to step S3.

At step S3, the second steering reaction torque calculation unit 41 calculates the second steering reaction torque Tr2 according to the difference between the actual steering angle Os and the actual wheel-turning angle θt. Then, processing proceeds to step S5.

At step S4, the second steering reaction torque calculation unit 41 calculates the second steering reaction torque Tt2 according to the difference between the actual steering angle θs and a virtual wheel-turning angle. Then, processing proceeds to step S5.

At step S5, the third steering reaction torque calculation unit 42 calculates the third steering reaction torque Tr3 according to the steering angular velocity dθs/dt of the actual steering angle θs.

At step S6, the adder 43 adds the first steering reaction torque Tr1, the second steering reaction torque Tr2, and the third steering reaction torque Tr3 to calculate the command reaction torque Tr, and outputs the control signal that causes the reaction force actuator 12 to generate the command reaction torque Tr to the first driver circuit 13. The first driver circuit 13 drives the reaction force actuator 12 in response to the control signal.

Effects of Embodiment (1) The reaction force control unit 37, the first driver circuit 13, and the reaction force actuator 12 apply the steering reaction force obtained by adding the first steering reaction force Tr1 according to the actual steering angle θs of the steering wheel 31a and the second steering reaction force Tr2 according to the steering angular acceleration $d^2θs/dt^2$ of the steering wheel 31a to the steering wheel 31a.

The emergency steering determination unit 38 determines the possibility that the emergency steering operation of the steering wheel 31a by the driver will be performed. When it is determined that there is the possibility of the emergency steering operation being performed, the reaction force control unit 37 makes the second steering reaction force Tr2 smaller than when it is not determined that there is the possibility of the emergency steering operation being performed.

As a result, when the driver applies a large force to the steering wheel 31a in an attempt to steer quickly during the emergency steering operation, the steering reaction force initially generated in response to such large force can be reduced. This facilitates the emergency steering operation and improves operability of the steering wheel 31a.

On the other hand, there remains a moderate steering reaction force due to the first steering reaction torque Tr1, so that even when the second steering reaction torque Tr2 is made small, the sense of discomfort about the steering reaction force can be reduced.

Therefore, when the emergency steering operation of the steering wheel 31a by the driver is performed, the operability of the steering wheel 31a is improved while reducing the sense of discomfort about the steering reaction force.

(2) The reaction force control unit 37, the first driver circuit 13, and the reaction force actuator 12 apply the steering reaction force Tr obtained by adding the third steering reaction force Tr3 according to the steering angular velocity dθs/dt of the steering wheel 31a, the first steering reaction force Tr1, and the second steering reaction force Tr2 to the steering wheel 31a.

By adding the third steering reaction force Tr3 according to the steering angular velocity dθs/dt, the steering reaction force corresponding to the frictional component and the viscous component can be applied, so that the sense of discomfort about the steering reaction force can be reduced.

(3) When the risk to an obstacle around the host vehicle is equal to or more than the threshold value, the emergency steering determination unit 38 determines that there is the possibility that the emergency steering operation will be performed. This allows the possibility of the emergency steering operation of the steering wheel 31a by the driver being performed to be determined more accurately.

(4) When the time to collision with the obstacle is equal to or less than the prescribed value, the emergency steering determination unit 38 determines that the risk is equal to or more than the threshold value. This allows the possibility of the emergency steering operation of the steering wheel 31a by the driver being performed to be determined more accurately.

(5) When it is not determined that there is the possibility of the emergency steering operation being performed, the torsional reaction force calculation unit 44 calculates the second steering reaction force Tr2 according to the difference between the actual wheel-turning angle θt of the steered wheels 34 and the actual steering angle θs. When it is determined that there is the possibility of the emergency steering operation being performed, the virtual wheel-turning angle calculation unit 45 calculates the second steering reaction force Tr2 according to the difference between a virtual wheel-turning angle set so as to respond to the change of the steering angle earlier than the actual wheel-turning angle and the actual steering angle θs.

This can give to the driver the feedback of a ground contact state of the steered wheels 34 on a road surface as the second steering reaction force Tr2. Additionally, when it is determined that there is the possibility of the emergency steering operation being performed, the second steering reaction force Tr2 can be reduced to facilitate the emergency steering operation and improve the operability of the steering wheel 31a.

(Modifications)

(1) In the above embodiment, when it is determined that there is the possibility of the emergency steering operation being performed, the second steering reaction torque calculation unit 41 has calculated the pseudo torsional reaction torque Trp as the second steering reaction torque Tr2. Additionally, when it is not determined that there is the possibility of the emergency steering operation being performed (or when it is determined that there is no possibility of the emergency steering operation being performed), the torsional reaction torque Trt has been calculated as the second steering reaction torque Tr2.

However, the present invention is not limited thereto, and the second steering reaction torque Tr2 may be calculated by various methods.

Figure 9:
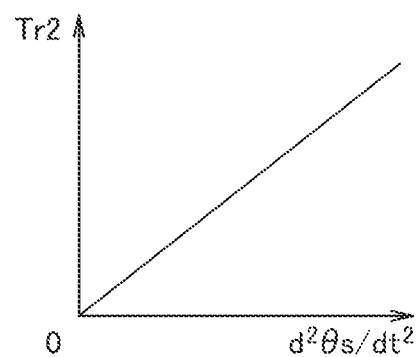
FIG. 9 is an illustrative diagram of one example of a second steering reaction torque Tr2.

For example, the second steering reaction torque calculation unit 41 may calculate the second steering reaction torque Tr2 that has characteristics as illustrated in FIG. 9. The second steering reaction torque Tr2 increases as the steering angular acceleration $d^2θs/dt^2$ of the steering wheel 31a increases.

When it is determined that there is the possibility of the emergency steering operation being performed, the second steering reaction torque calculation unit 41 may set the second steering reaction torque Tr2 to 0. This allows the reaction torque component proportional to the force (torque) applied to the steering wheel 31a to be reduced to 0, so that the operability of the steering wheel 31a can be further improved.

Additionally, when it is determined that there is the possibility of the emergency steering operation being performed, the second steering reaction torque calculation unit 41 may reduce the slope of a characteristic line illustrated in FIG. 9 or provide an upper limit value to reduce the second steering reaction torque Tr2.

(2) The above embodiment has described the case for employing the steer-by-wire (SBW) system in which the steering unit 31 that receives a steering input from the driver and the wheel-turning unit 32 that turns the left and right front wheels 34FL and 34FR, which are the steered wheels, are mechanically disconnected. However, the present invention is not limited thereto, and can also be applied to cases for employing an electric power steering device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

11: Controller
12: Reaction force actuator
13: First driver circuit
14: Wheel-turning actuator
15: Second driver circuit
16: External sensor
19: Steering angle sensor
20: Processor
21: Storage device
31: Steering unit
31a: Steering wheel
31b: Column shaft
31c: Current sensor
32: Wheel-turning unit
32a: Pinion shaft
32b: Steering gear
32c: Rack gear
32d: Steering rack
33: Backup clutch
34: Steered wheels
34FL: Left front wheel
34FR: Right front wheel
35: Wheel-turning angle sensor
36: Wheel-turning control unit
37: Reaction force control unit
38: Emergency steering determination unit
40: First steering reaction torque calculation unit
41: Second steering reaction torque calculation unit
42: Third steering reaction torque calculation unit
43: Adder
44: Reaction force calculation unit
45: Virtual wheel-turning angle calculation unit
46: Reaction force calculation unit
47: Switching unit

The invention claimed is:

1. A steering control method comprising:
applying a steering reaction force obtained by adding a first steering reaction force according to a steering angle of a steering wheel and a second steering reaction force according to a steering angular acceleration of the steering wheel to the steering wheel;
determining a possibility that an emergency steering operation of the steering wheel by a driver will be performed; and
when it is determined that there is the possibility of the emergency steering operation being performed, making the second steering reaction force small compared with when it is not determined that there is the possibility of the emergency steering operation being performed.

2. The steering control method according to claim 1, wherein when it is determined that there is the possibility of the emergency steering operation being performed, the second steering reaction force is set to 0.

3. The steering control method according to claim 1, wherein the steering reaction force obtained by adding a third steering reaction force according to a steering angular velocity of the steering wheel, the first steering reaction force, and the second steering reaction force is applied to the steering wheel.

4. The steering control method according to claim 1, wherein when a risk to an obstacle around a host vehicle is equal to or more than a threshold value, it is determined that there is the possibility of the emergency steering operation being performed.

5. The steering control method according to claim 4, wherein when a time to collision with the obstacle is equal to or less than a prescribed value, it is determined that the risk is equal to or more than the threshold value.

6. The steering control method according to claim 1, wherein when it is not determined that there is the possibility of the emergency steering operation being performed, the second steering reaction force is calculated according to a difference between an actual wheel-turning angle of steered wheels and the steering angle, and when it is determined that there is the possibility of the emergency steering operation being performed, the second steering reaction force is calculated according to a difference between a virtual wheel-turning angle set to respond to a change of the steering angle earlier than the actual wheel-turning angle and the steering angle.

7. A steering control device comprising:
a reaction force actuator configured to apply a steering reaction force to a steering wheel;
a driver circuit configured to drive the reaction force actuator; and
a controller configured to output a control signal configured to cause the reaction force actuator to generate a steering reaction force obtained by adding a first steering reaction force according to a steering angle of the steering wheel and a second steering reaction force according to a steering angular acceleration of the steering wheel to the driver circuit, wherein the controller determines a possibility that an emergency steering operation of the steering wheel by a driver will be performed, and, when it is determined that there is the possibility of the emergency steering operation being performed, makes the second steering reaction force small compared with when it is not determined that there is the possibility of the emergency steering operation being performed.

* * * * *